(12) United States Patent
Tomlinson et al.

(10) Patent No.: US 9,521,097 B2
(45) Date of Patent: Dec. 13, 2016

(54) SYSTEM AND METHOD FOR MANAGEMENT OF PERSISTENT AND IRREFUTABLE INSTANT MESSAGES

(71) Applicants: Martin Tomlinson, Totnes (GB); Andersen Cheng, London (GB); Cen Jung Tjhai, Plymouth (GB)

(72) Inventors: Martin Tomlinson, Totnes (GB); Andersen Cheng, London (GB); Cen Jung Tjhai, Plymouth (GB)

(*) Notice: Subject to any disclaimer, the term of this patent is extended or adjusted under 35 U.S.C. 154(b) by 46 days.

(21) Appl. No.: 14/315,466

(22) Filed: Jun. 26, 2014

(65) Prior Publication Data

US 2015/0365361 A1    Dec. 17, 2015

(51) Int. Cl.
| | | |
|---|---|---|
| G06F 15/16 | (2006.01) | |
| H04L 12/58 | (2006.01) | |
| H04L 9/32 | (2006.01) | |
| H04L 29/06 | (2006.01) | |

(52) U.S. Cl.
CPC ........... *H04L 51/043* (2013.01); *H04L 9/3247* (2013.01); *H04L 51/04* (2013.01); *H04L 67/42* (2013.01)

(58) Field of Classification Search
CPC ....... H04L 51/04; H04L 51/043; H04L 9/3247
See application file for complete search history.

(56) References Cited

U.S. PATENT DOCUMENTS

| | | | | |
|---|---|---|---|---|
| 7,370,278 | B2* | 5/2008 | Malik | H04L 12/581 715/753 |
| 7,730,143 | B1* | 6/2010 | Appelman | H04L 12/5855 455/466 |
| 7,975,012 | B2* | 7/2011 | Jennings, III | H04L 12/581 709/204 |
| 8,060,566 | B2* | 11/2011 | Appleman | H04L 12/5855 709/206 |
| 8,706,826 | B2* | 4/2014 | Appelman | H04L 12/5855 709/206 |
| 8,972,504 | B2* | 3/2015 | Kao | G06Q 10/107 370/224 |
| 2003/0187939 | A1* | 10/2003 | O'Brien | H04L 51/18 709/206 |
| 2006/0173966 | A1* | 8/2006 | Jennings, III | H04L 12/581 709/207 |
| 2007/0156836 | A1 | 7/2007 | Kelso et al. | |
| 2008/0263167 | A1* | 10/2008 | Jennings | H04L 12/581 709/206 |

(Continued)

*Primary Examiner* — Moustafa M Meky
(74) *Attorney, Agent, or Firm* — Morris & Kamlay LLP (57) ABSTRACT

The present disclosure includes systems and methods for providing instant messaging communication between users via a communication network. Instant messaging clients are executed at user devices of a first and second user. A data message is transmitted from the instant messaging client at the user device of the first user to the instant messaging client at the user device of the second user, the data message having a content portion and at least one associated attribute that is cryptographically generated. The cryptographic attribute plus any additional first user attributes irrefutably binds the ID of the first user to the message information content to form an irrevocable message. The availability of at least one user-selectable function by the instant messaging client at the user device of the second user is controllable, based on the at least one associated attribute.

19 Claims, 9 Drawing Sheets

(56) References Cited

U.S. PATENT DOCUMENTS

| | | | | |
|---|---|---|---|---|
| 2010/0285843 A1* | 11/2010 | Appelman | .......... | H04L 12/5855 |
| | | | | 455/566 |
| 2012/0083297 A1* | 4/2012 | Appelman | .......... | H04L 12/5855 |
| | | | | 455/466 |
| 2014/0297766 A1* | 10/2014 | Imes | ................ | H04L 51/04 |
| | | | | 709/206 |
| 2015/0195223 A1* | 7/2015 | Appelman | ............ | H04L 12/581 |
| | | | | 455/466 |

* cited by examiner

SYSTEM AND METHOD FOR MANAGEMENT OF PERSISTENT AND IRREFUTABLE INSTANT MESSAGES

FIELD OF THE INVENTION

This invention relates to data communication, and more particularly to systems and methods for computer-based instant messaging communications.

BACKGROUND OF THE INVENTION

Instant messaging ("IM") systems and applications are well-known, in which data messages are exchanged between users in real-time. However, typical IM systems are conventionally targeted at social users where messages in the IM conversations do not provide any commitment or obligations on the participating users. Although some IM systems may apply a certain level of encryption to the content data of transmitted messages, there is a general lack of robustness and management of data messages for a secured and accountable IM environment.

In many commercial activities such as buying a product or negotiating a contract there is a need for the recipient to have irrefutable proof or access to said irrefutable proof that the sender made that purchase or agreed to those contract terms. The framework for these activities is not provided by current IM systems. What is needed is a framework in which sent messages contain information content that is irrevocable and irrefutably bound to the sender, and also to the recipient once the content is agreed upon. It is the objective of this invention to provide such a framework.

STATEMENTS OF THE INVENTION

Aspects of the present invention are set out in the accompanying claims.

According to one aspect, the present invention provides a method of providing instant messaging communication between users via a communication network, comprising executing an instant messaging client at a user device of a first user and an instant messaging client at a user device of a second user, transmitting a data message from the instant messaging client at the user device of the first user to the instant messaging client at the user device of the second user, the data message having a content portion and at least one associated attribute, and controlling the availability of at least one user-selectable function by the instant messaging client at the user device of the second user, based on the at least one associated attribute.

The at least one associated attribute may include an attribute identifying the content portion as persistent data, and wherein controlling the availability of at least one user-selectable function comprises disabling or omitting a data message delete function. The at least one associated attribute may further include an attribute identifying an acknowledgement status of the data message, wherein controlling the availability of at least one user-selectable function is further based on the acknowledgement status of the data message.

The instant messaging client at the user device of the second user may prompt for a user input signature to acknowledge receipt of the data message based on an unsigned acknowledgement status. The signature may be a digital signature that binds the identity of the recipient to the information content of the message, for example based on a public-private key encryption protocol. Alternatively, the signature may be a biometric information file including at least a portion of the content portion implanted therein.

The availability of the same at least one user-selectable function may also be controlled by the instant messaging client at the user device of the first user, based on the at least one associated attribute.

A non-persistent data message may be determined to be expired based on at least one message attribute, and removing the content portion of the expired non-persistent data message from memory. A plurality of sequential data messages of a conversation may be displayed, wherein a footprint of a non-persistent data message having a content portion that was removed from memory is retained in the displayed conversation. The footprint may include a digital signature of the first user.

The data message may be transmitted from the instant messaging client at the user device of the first user to an instant messaging client at a user device of a third user. Synchronisation of the at least one associated attribute of corresponding data messages at all of the instant messaging clients may be maintained by a remote messaging server.

The content portion of the data message may comprise one or more of: text data, image data, audio data, video data and encoded data, or combinations thereof.

One or more recipients may be determined to be offline and in response, the data message may be stored on one or more servers until it is determined that the recipients become online and subsequently receive the data message sent by said servers.

In further aspects, the present invention provides a system comprising means for performing the above methods. In yet other aspects, there is provided a computer program arranged to carry out the above methods when executed by a programmable device.

BRIEF DESCRIPTION OF THE DRAWINGS

There now follows, by way of example only, a detailed description of embodiments of the present invention, with references to the figures identified below.

DETAILED DESCRIPTION OF EMBODIMENTS OF THE INVENTION

Figure 1:
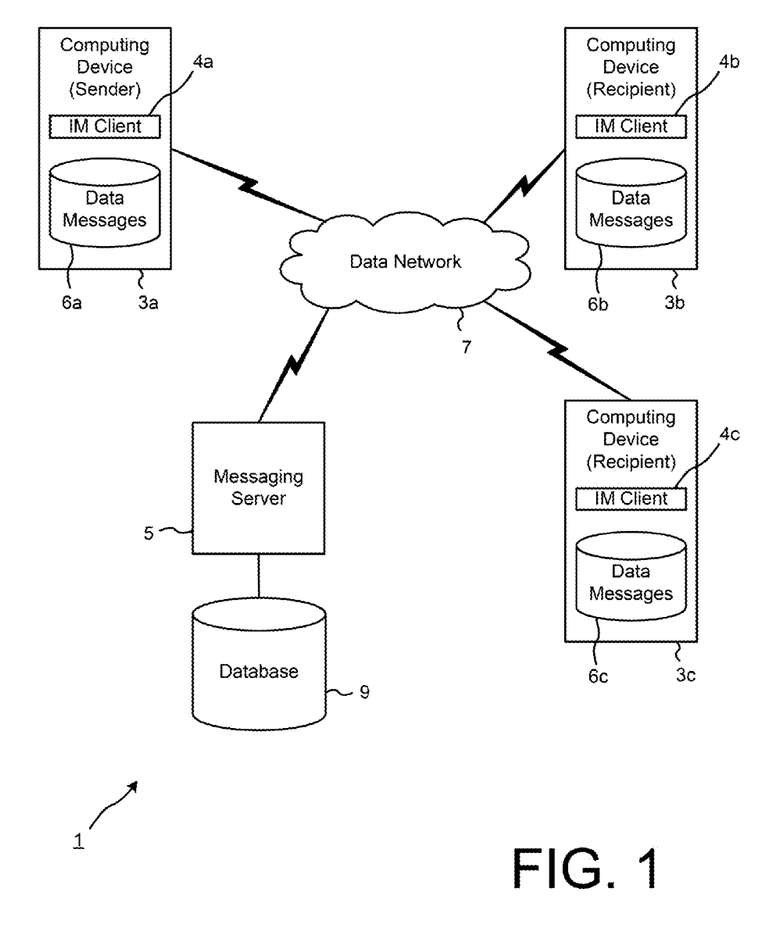
FIG. 1 is a block diagram showing the main components of a data communication system according to an embodiment of the invention.

A specific embodiment of the invention will now be described for an example method of sending a persistent data message from a source device to one or more recipient devices, the data message having an associated irrevocable state set by a sender, which is enforced by the recipient devices. Referring to FIG. 1, a data communication system 1 according to the present exemplary embodiment comprises a first user device 3a in communication with at least one other user device 3b, 3c via a messaging server 5 and a data network 7. The user devices 3 are associated with respective registered users of the system 1, the messaging server 5 storing data identifying each registered user in a database 9. The devices 3 execute respective instant messaging (IM) client applications (or software modules) 4, having a user interface for the user to compose and transmit data messages to other users, and for displaying transmitted and received data messages of an IM conversation. The transmitted and received data messages are stored in a memory 6 of the respective devices.

The devices 3 may be of a type that is known per se, such as a desktop computer, laptop computer, a tablet computer, a smartphone such as an iOS™, Blackberry™ or Android™ based smartphone, a 'feature' phone, a personal digital assistant (PDA), or any processor-powered device with suitable input and display means. The data network 7 may comprise a terrestrial cellular network such as a 2G, 3G or 4G network, a private or public wireless network such as a WiFi™-based network and/or a mobile satellite network or the Internet. It will be appreciated that a plurality of devices 3 are operable concurrently within the system 1.

Figure 2:
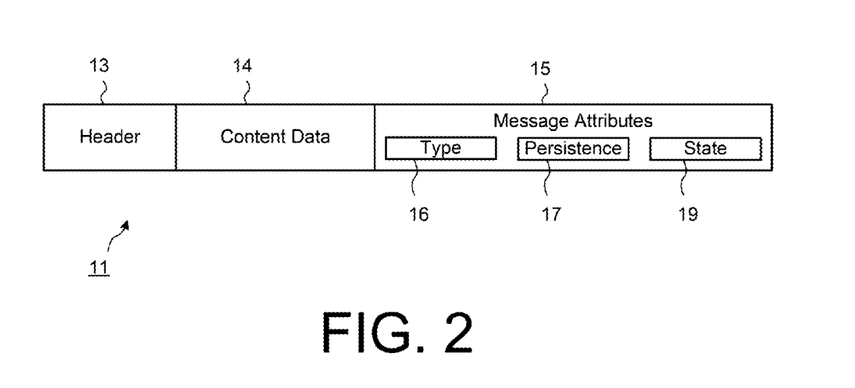
FIG. 2 is a block diagram schematically illustrating the format of an exemplary data message.

For the purposes of describing the exemplary process of the present embodiment, the first user device 3a is associated with a sender using the device 3a to send information to one or more recipients using similar devices 3b, 3c. Preferably, the information is packetised into one or more data packets according to a predefined standard format. FIG. 2 schematically illustrates an example of the format of an exemplary data message 11 that is generated by the IM clients 4 in the present embodiments. Typically, the data message 11 is composed of bits transmitted by the sender device 3a. A header 13 of the data message 11 can comprise codes that uniquely represent the network addresses of the sender and the recipient devices 3. The sender's address identifies to the recipients who sent the data message. The recipients' addresses informs the system 5 indirectly how to route the data messages 11 through the data network 7 so that it may be delivered to each recipient device 3b, 3c. The information content of the data message 11 is provided in one or more content data portions 14. The content portion 14 of the data message 11 may comprise one or more of text data, image data, audio data, video data and encoded data, or combinations thereof.

The data message 11 also includes data identifying a plurality of attributes 15 associated with the data message and/or the content data 14. In this embodiment, the message attributes 15 include an attribute 16 defining a message type of the associated data message 16, and a persistence attribute 17 defining a persistence state for the contents of the data message, which is to be applied by the IM clients 4 of the sender and recipient devices 3. The message attributes 15 can also include an message state attribute 19, which is used to identify a current status of the data message 11. For example, the message state attribute 19 can include, but is not limited to, data indicating that the data message is being transmitted to the server 5 but not yet delivered to the recipient device 3b, 3c, that the recipient device 3b, 3c has received the data message 1 but not yet opened or viewed the contents of the data message 11, that the recipient device 3b, 3c has viewed the contents of the data message 11, that the recipient device 3b, 3c has confirmed receipt of and/or signed a received data message 11 to explicitly acknowledge receipt and/or accept or consent to any terms or conditions set out by the content data 14 of the data message 11, that the data message 11 has been counter-signed by the original sender device 3a, etc.

Preferably, the data message 11 can further include at least one cryptographic attribute identifying that the content data 14 is encrypted and the encryption scheme utilised, as well as data defining a biometric binding of the message content data 14 and the sender's irrefutable identification, for example as described in the applicant's own patent GB2487503B and application GB1406081.8.

The messaging server 5 shown in FIG. 1 is configured to communicate with all user devices 3 and can be configured to monitor and store data identifying whether the users and respective devices 3 are online, that is those devices 3 that have communications ability to send and receive data messages, and those devices 3 which are offline and temporarily are unable to send and receive data messages. It is appreciated that the IM client 4 user interfaces may enable users to set their own presence state that will be seen by other users, such as online, offline, busy, etc. Considering as an example the case where the Sender's device 3a shown in FIG. 1, which is online, wants to send a data message to both Recipient A and Recipient B. Recipient A's device 3b is online and Recipient B's device 3c is offline. The server 5 is able to communicate with all online devices 3 and so the Sender's device 3a knows that Recipient A's device 3b is online and Recipient B's device 3c is offline. Accordingly, the Sender's device 3a sends the data message directly to Recipient A's device 3b, or indirectly to Recipient A's device 3b, for example via the messaging server 5 and/or a peer-to-peer based arrangement. Knowing that Recipient B's device 3c is offline, the Sender sends the data message to the server 5 where the data message is stored until Recipient B's device 3c becomes online and then the data message is sent by the server 5 to Recipient B's device 3c. The data message can be deleted from memory 9 in the messaging server 5 once the server 5 is confident the transmitted packet or packets for the data message 11 have been received by Recipient B's device 3b. It is appreciated that in the context of IM conversations, the participating users of the conversation may act as both a sender of one or more data messages to another user, as well as a recipient of one or more data messages from the same or another user, via the user's IM client 4.

In the present embodiment, the IM clients 4 enable the transmission and display of data messages 11 containing information content that requires strict control and irrefutable record of acknowledgement of receipt by the intended recipient as well as data persistence by the respective devices, as definable by the message state 16 and persistence attribute 17 of each associated data message 11. As will be described in more detail below, the present embodiment provides a novel message data structure and a corresponding robust technique for applying user-definable data persistence to respective data messages, and facilitating reception, confirmation and storage of irrevocable data messages between the sender and the recipient IM clients 4. Optionally, a copy of all persistent messages between users may be stored on the messaging server 5, or on another secured third-party server (not shown), as a permanent record in case of brute force deletion (destruction) by a malicious user.

Figure 3:
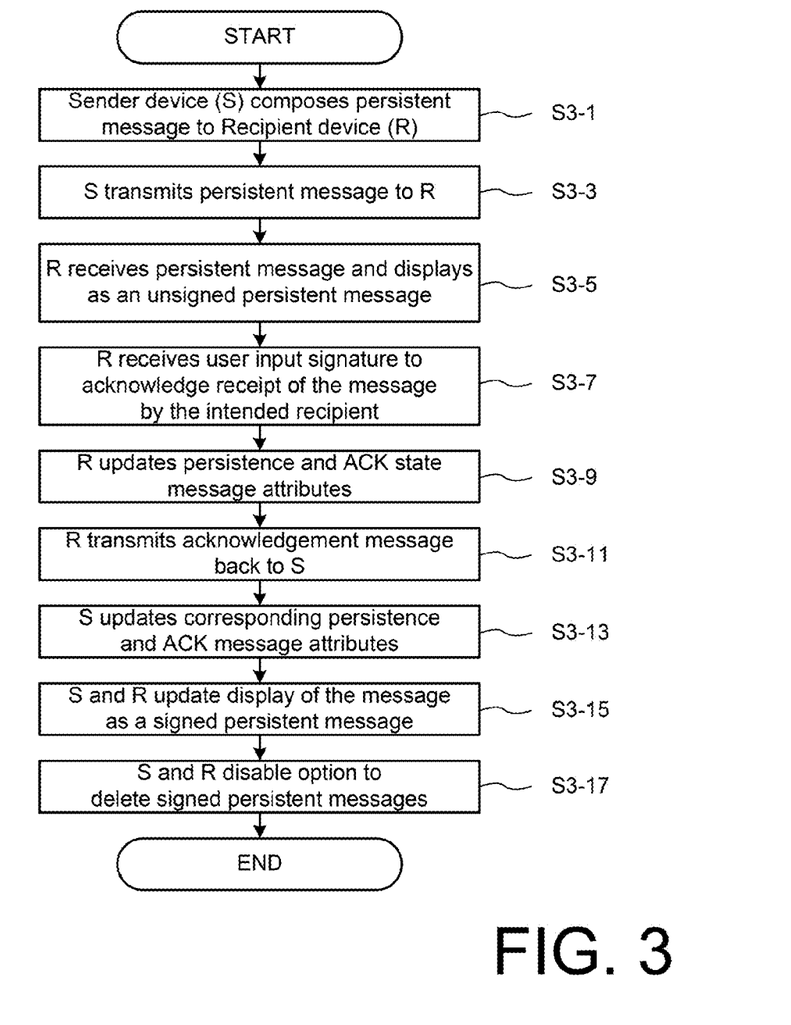
FIG. 3 is a flow diagram of a persistent instant message enforcement process according to an embodiment of the invention.

FIG. 3 is a flow diagram of an exemplary process for controlling the persistence state of data messages within an instant messaging environment. Reference is also made to FIGS. 4 to 10, which are exemplary display screens of sender and recipient IM clients 4. As shown in FIG. 3, at step S3-1, the IM client 4a of the sender device 3a receives user input to compose a data message for one or more recipient users of the system 1. In this exemplary embodiment, the data message is input by the sender as a persistent type data message, whereby the contents of the data message must be acknowledged by the recipient and subsequently preserved within the IM conversation such that the message content 14 cannot be deleted by the recipient devices 3b, 3c.

Figure 4:
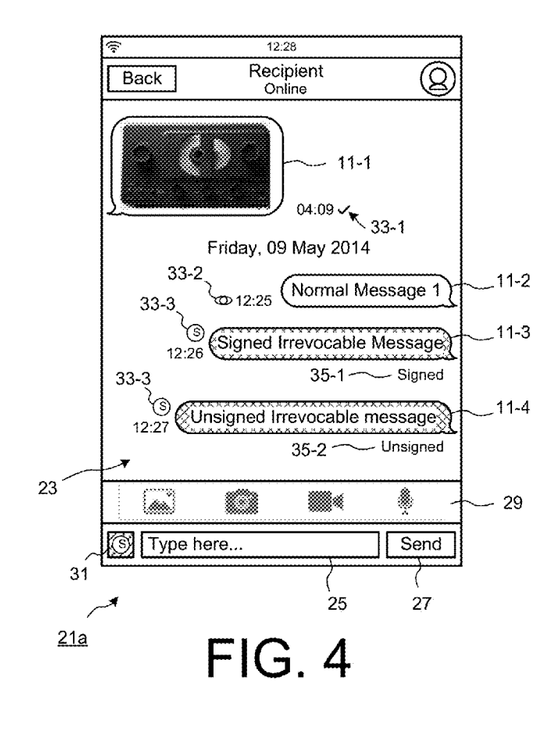
FIGS. 4 to 13 are exemplary display screens of instant messaging clients according to embodiments of the present invention.
Figure 5:
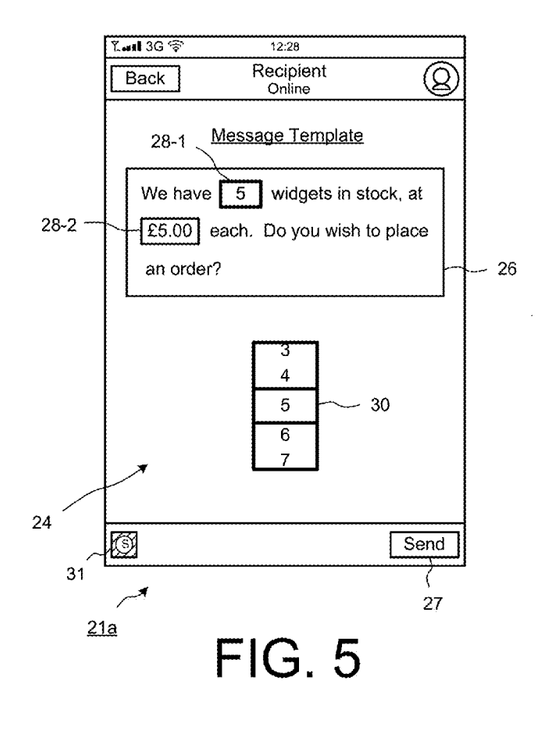

FIG. 4 shows an exemplary user interface 21a of a sender's IM client 4a, displaying a sequence of data messages 11 of an IM conversation within a message display portion 23 of the interface 21. In this particular example, the IM conversation is between the sender and a recipient who is currently online. It will be appreciated that a group IM conversation may include data messages 11 between the sender and a plurality of recipients in the group. The user interface 21 provides a text input field 25 for the sender to input text data to compose a new data message 11, and a user-selectable button 27 to send the composed data message 11. A user-selectable menu 29 can also be presented for the sender to select other types of content data to be included in a data message 11. In this exemplary embodiment, the user interface 21 also provides a user-selectable element 31 to define the composed data message as having an irrevocable data message type 16 and including an initial persistence attribute 17 indicating that the content is not yet irrevocable. Alternatively or additionally, a plurality of template data messages 26 may be stored by the IM client 4 for irrevocable data message types, and the user interface 21 may prompt the sender to select one of the stored templates to compose a new data message. FIG. 5 illustrates one example message template 26 displayed in a template message composition portion 24 of the sender's user interface 21a. In this example, the template message content 26 includes two user-selectable input fields 28, prompting the sender to input a configurable value for the composed message to be sent, for example via an input element 30 of the user interface 21a. It is appreciated that many other forms of template message and content may be provided.

Optionally, the user interface 21 can further prompt for user input to verify the sender's identity after the message content 14 has been composed, for example by recording a voice or video recording of the sender reading or handwriting at least a portion of the message content, similar to the techniques described in the applicant's own patent GB2487503B and application GB1406081.8. In this way, the sender's IM client 4a can bind the message content data 14 and sender's identity. Together with encryption of the content data 14, an absolute level of irrefutable data is thereby provided to verify that the sender of that particular data message is who he or she claims to be, based on the cryptographic attributes and irrefutable biometric binding.

As shown in FIG. 4, the visible portion of an IM conversation between the sender and a recipient includes a plurality of data messages 11 stored by the sender device 3a, including data messages 11 previously received from the recipient and data messages 11 previously composed and transmitted by the sender. The user may scroll through the list of time-stamped data messages 11 of the IM conversation that are displayed in the message display portion 23. In the illustrated example, the displayed data messages 11 include a first data message 11-1 having image content data 14 and a second data message 11-2 having plain text content data 14. In this example, the first and second data messages 11-1, 11-2 have respective "normal" message type data attributes 16 and do not have an associated persistence attribute 17. It is appreciated that normal messages may instead have a persistence attribute 17 that is not set, or that is set to NULL or zero, etc. As is known in the art, a visual indication such as an icon 33 and/or a status text field 35 may be provided adjacent the displayed data message 11 to indicate the present status of the message based on the associated message state attribute 19. For example, the first data message 11-1 is displayed with a check mark icon 33-1, indicating that the recipient has acknowledged receipt of the associated message content. The second data message 11-2 is displayed with an eye icon 33-2, indicating that the recipient has received and viewed the associated message content but has not yet acknowledged receipt.

Figure 6:
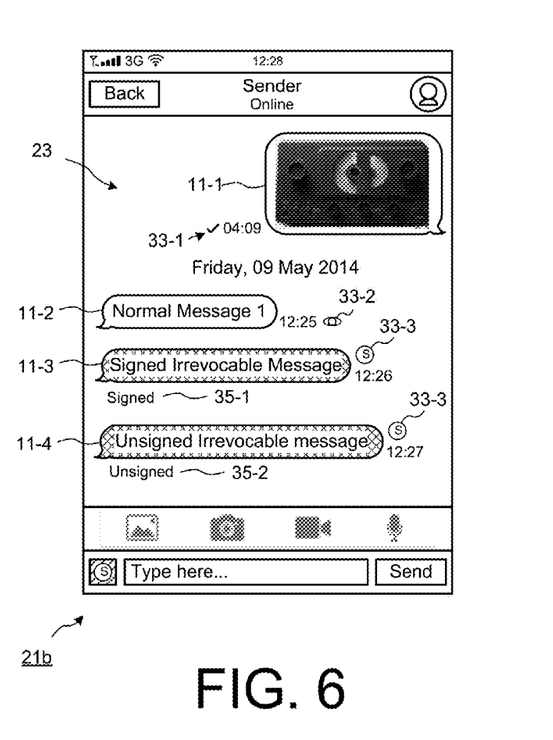

FIG. 6 shows an exemplary user interface 21b of a recipient's client 4b, where the recipient has selected the received second data message 11-2, and a plurality of user-selectable entities 41 are consequently displayed, including an entity 41-1 prompting the recipient to acknowledge receipt of the content of that data message 11-2. It will be appreciated that the illustrated display of user-selectable entities 41 is just one example of a user interface 21 for facilitating user-selectable actions for a received data message. In response to receiving input from the recipient to acknowledge receipt of a data message 11, the recipient's client 4b transmits an update message back to the sender's client 4a, and the recipient and sender clients 4 proceed to update the acknowledgement attribute 19 of the associated data message 11. Also illustrated in FIG. 6 are additional example user-selectable functions that can be applied to the message content, including delete, copy and forward actions, as are known in the art.

Figure 7:
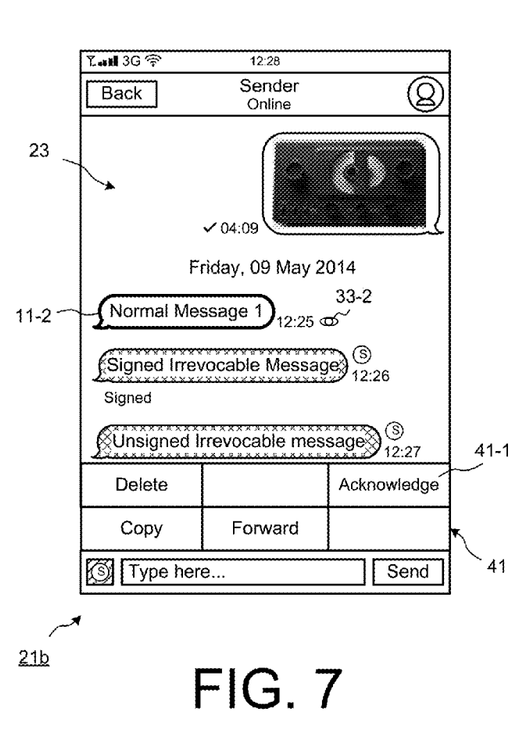

The example IM conversation in FIGS. 4, 6 and 7 also includes a third data message 11-3 and a fourth data message 11-4 including respective plain text content data 14. In this example, the third and fourth data messages 11-3, 11-4 have an irrevocable message type attribute 16, set by IM client 4a of the sender device 3a, but the respective persistence attribute 17 is not set until the recipient 3 has acknowledged receipt of the irrevocable message 11-3, 11-4. The user interface 21 display an indication 31 that a displayed data message 11 is an irrevocable message, for example text, symbol, and/or image icon provided adjacent the displayed content data of the data message 11. Irrevocable messages such as the third and fourth data messages 11-3, 11-4 may also be displayed in a different format to normal messages such as the first and second data messages 11-1, 11-2, for example using a different colour and shaded background, outline shape, etc. The user interface 21 also displays a respective status indication 35 adjacent each irrevocable data message 11-3, 11-4, based on the associated acknowledgement attribute 19. In the illustrated example, the third data message 11-3 has a signed acknowledgement status and the fourth data message 11-4 has an unsigned status.

Returning to FIG. 3, at step S3-3, the sender device 3a transmits the composed persistent data message to the recipient's device 3b, 3c, either directly or indirectly for example via the messaging server 5. The persistent data message is received by the recipient device 3b, 3c at step S3-5, and displayed by the recipient's IM client 4b as an unsigned persistent data message 11. FIG. 7 shows an exemplary user interface 21b of a recipient's client 4b, in which corresponding data messages 11 of the IM conversation are displayed in a respective message display portion 23 of the IM client 4b. In particular, the corresponding third and fourth data messages 11-3, 11-4 are displayed by the recipient's IM client 4b with an indication 31 that the messages have an irrevocable message type 16 and the respective acknowledgement status indications 35-1, 35-2 based on the associated acknowledgement attribute 19. In the illustrated example, messages of an irrevocable message type 16 are displayed with a cross-hatching but it will be appreciated that any other form of visual highlighting or indication may instead be used.

Figure 8:
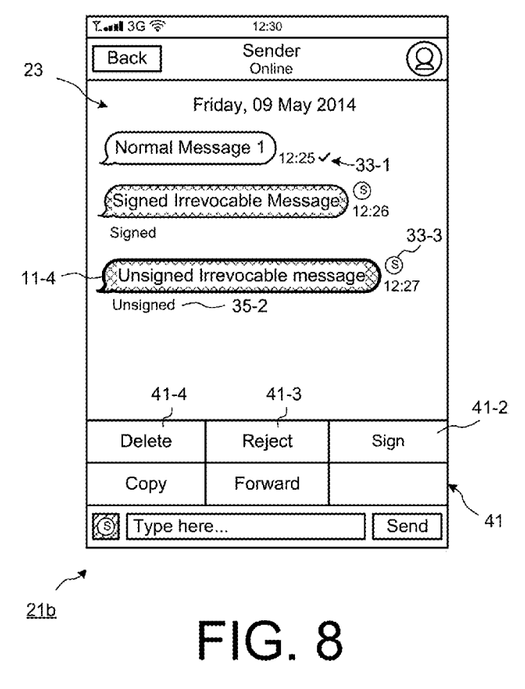

FIG. 8 shows the exemplary user interface 21b of a recipient's client 4b, where the recipient has selected the unsigned irrevocable data message 11-4, and a plurality of user-selectable entities 41 are consequently displayed, including an entity 41-2 prompting the recipient to initiate a function to sign that particular received irrevocable data message 11-4. At step S3-7, the recipient's IM client 4b prompts for and receives input of data representative of an input signature to acknowledge receipt of the message by the intended recipient. In the example shown in FIG. 8, the recipient is also provided with the options to reject 41-3 and/or delete 41-4 the received unsigned irrevocable data message 11-4, in which case the sender would be notified accordingly.

Figure 9:
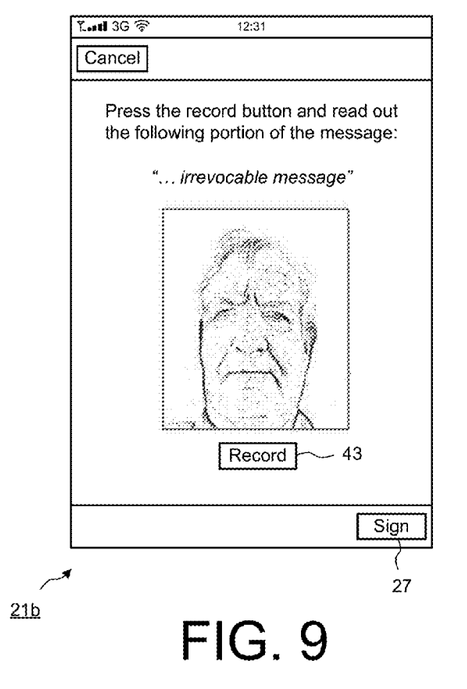

FIG. 9 shows a user interface 21b of one exemplary signing process, where the recipient's IM client 4b is configured to prompt the user to record a biometric signature implanting at least a portion of the message content or a calculated hash value of at least a portion of the message content, for example as described in the applicant's own patent GB2487503B and application GB1406081.8. In the illustrated example, the recipient is prompted to press a record button 43 to generate an audio and/or video recording of the recipient himself or herself reading out at least a portion of the received message content. Alternatively, the recipient IM client 4b may prompt the user to input an electronic hand-written signature, for example within an identified region of a touchscreen display of the device 2. In response to the user providing a digital signature and selecting the "sign" button 27 to transmit the digital signature data back to the sender's client 4a, the recipient IM client 4b updates the acknowledgement attribute 19 of the associated data message 11, at step S3-9.

In an exemplary embodiment, the signing process involves data messages 11 that are digitally signed by the sender so that recipients can be sure the received content data 14 is associated with the true ID of the sender, and more generally that the received data messages 11 are genuine. In certain applications of the present embodiments, recipients need to be certain that they have complied with rules or laws pertaining to time sensitive information. For example, the RSA public-private key-based cryptography system as discussed in "A Method for Obtaining Digital Signatures and Public-Key Cryptosystems", R. Rivest, A. Shamir and L. Adleman Communications of the ACM 21 (2): 120-126, 1978. can be employed, where the sender securely holds a private key, which is used for signing. The recipients are in possession of the sender's public key. In the signing operation, prior to being transmitted in data messages 11, content data 14 is decrypted by the sender device 3a using his or her private key, and the resulting decrypted output is thereby contained in the transmitted data messages 11. Following data message 11 reception, the recipient devices 3b, 3c perform the reverse process by encrypting the received text using the sender's public key to retrieve the content data 14. The recipients know at this stage that the only person who could have sent the data message is the sender because no one else is in the possession of the sender's private key. In this way the sender has uniquely signed the data message.

Figure 10:
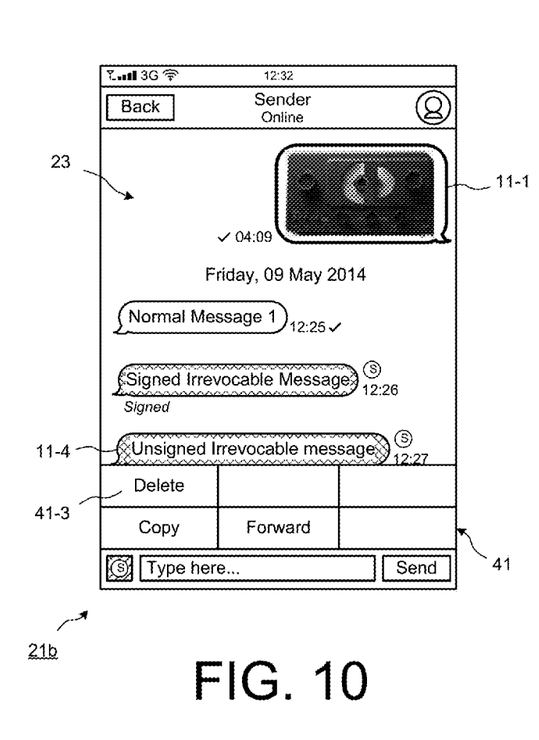

At step S3-11, the recipient's IM client 4b, 4c transmits an acknowledgement status update message back to the sender, whereby the sender's IM client 4a updates the acknowledgement attribute 19 of the corresponding data message 11 stored in the memory 6a of the sender's device 3a, at step S3-13. The acknowledgement status update message can include an identifier of the associated data message 11 and a data value identifying a timestamp when the associated data message was signed by the recipient using the recipient's private key in a similar procedure to that used by the sender in signing. Following on from the exemplary signing process shown in FIG. 9, FIG. 10 shows the exemplary user interface 21b of a recipient's client 4b, where the fourth data message 11-4 is now displayed with a signed acknowledgement status indication 35-2, based on the updated acknowledgement attribute 19. In this way, the acknowledgement status of each data message 11 is synchronised between sender and recipient devices 3, and at step S3-15, both sender and recipient IM clients 4 update the display of the data message as a signed persistent data message 11-4. In this way, the signature data can be stored by both the sender and recipient IM clients 4 as irrefutable proof that the message content of the associated data message was received and viewed by the intended recipient.

Figure 11:
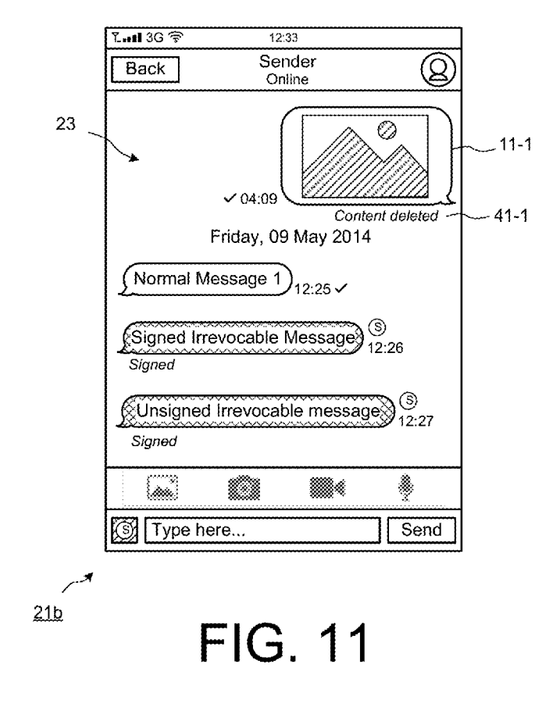

As is known in the art, the IM client 4 can provide one or more user-selectable functions that can be performed on one or more of the "normal" data messages 11 in an IM conversation, that is stored data messages 11 that do not have a persistence attribute 17 that has been set by the sender. For example, the content data 14 of such normal data messages 11 can typically be copied, deleted or forwarded on to another recipient. In the example user interface 21b shown in FIG. 10, a plurality of user-selectable message functions 41 are provided in response to user input selection of the first data message 11-1, including a delete function 41-3. In response to user selection of the delete function 41-3, the image content data 14 of the first data message 11-1 is deleted from the memory 6b, 6c of the recipient device 3b, 3c by the IM client 4b, 4c. Following on from FIG. 10, FIG. 11 shows the exemplary user interface 21b of a recipient's client 4b, where the first data message 11-1 is now displayed as a deleted data message, for example by way of a corresponding content deleted status identifier 41-1. In this example, the IM client 4 is configured to retain a message footprint for the deleted data message within the displayed IM conversation, providing an indication that the first data message 11-1 had been previously received at an identified time.

Figure 12:
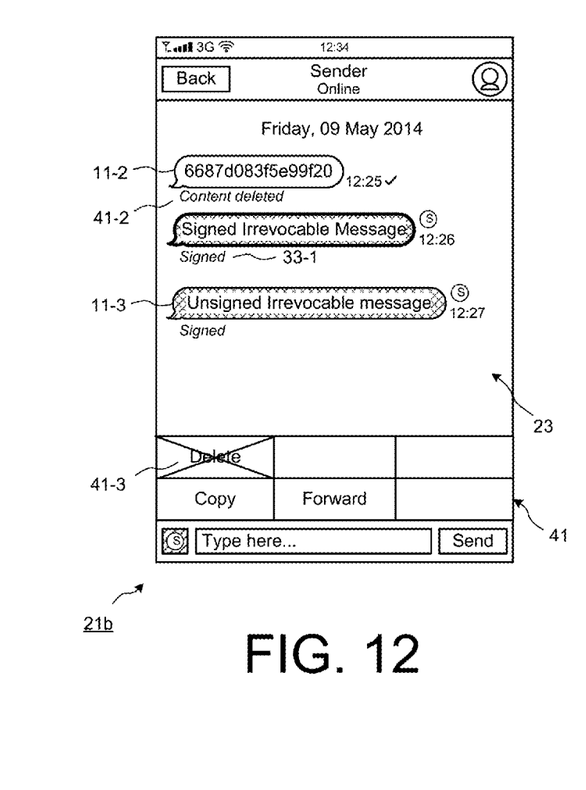

FIG. 11 shows an example of the IM conversation in which a message footprint for deleted image content data 11-1 is displayed for the data message having a timestamp of 04:09 after it is determined to have been deleted. Alternatively, the entire data message may be deleted from the server's memory 9 so that the recipient is not aware of the data message deletion. FIG. 12 shows the exemplary user interface 21b of a recipient's client 4b, where the second data message 11-2 has been deleted and is now displayed as a deleted data message having a corresponding content deleted status identifier 41-2. As shown in FIG. 12, the content data 14 of a deleted normal data message 11-2 with text based content 14 may be replaced with a predefined text element, such as a digital signature of the sender. The content data of the corresponding data message stored by the sender device 3a may be automatically deleted in response to a subsequent status update message transmitted by the recipient's IM client 4b, 4c.

Figure 13:
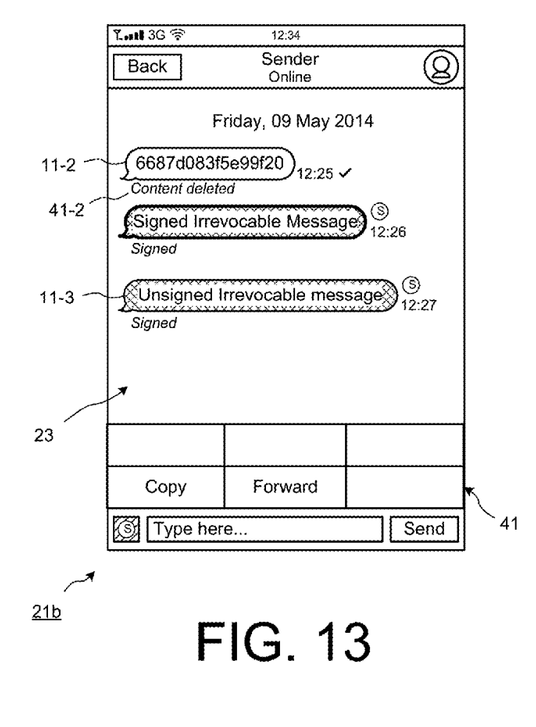

In the present embodiment, the IM clients 4 on the recipient devices 3b, 3c are configured to disable the delete function 39 for all persistent data messages 11 stored in memory 6 and displayed by the respective user interfaces 21, as illustrated by step S3-17. In the exemplary recipient's user interface 21b illustrated in FIG. 12, the recipient has selected a signed irrevocable data message 11-3, and a plurality of user-selectable entities 41 are consequently displayed as described above, but in this example, the delete function 41-3 is disabled and is not selectable by the user, as schematically illustrated with by the crossed out displayed entity 39. It is appreciated that as an alternative, the IM client 4 may instead be configured to omit the delete function 41-3 from the available displayed message functions, when a message is determined to be irrevocable, for example as shown in the example of FIG. 13. Additionally, the IM client 4a on the sender device 3a may also be configured to disable and/or omit the delete function 39 of the respective user interface 21.

Computer Systems

Figure 14:
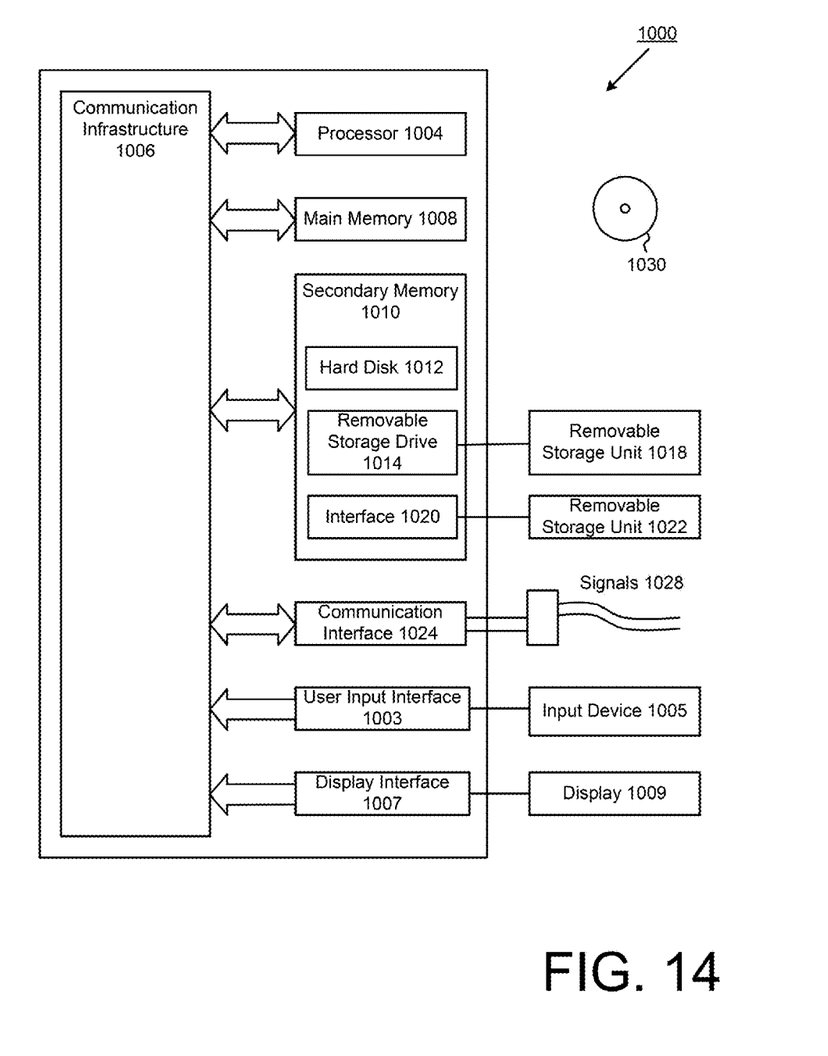
FIG. 14 is a block diagram of an example of a computer system on which one or more of the functions of the embodiments may be implemented.

The entities described herein, such as the sender and recipient devices 3 and the server 5, may be implemented by computer systems such as computer system 1000 as shown in FIG. 14. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples. Alternative embodiments may be implemented as control logic in hardware, firmware, or software or any combination thereof.

Alternatives and Modifications

It will be understood that embodiments of the present invention are described herein by way of example only, and that various changes and modifications may be made without departing from the scope of the invention.

For example, in the embodiments described above, only the message delete function is disabled for irrevocable data messages. Additionally or alternatively, other data message functionality may be disabled for data messages that are defined as irrevocable and/or that are unsigned. For example, the IM client of the receiver devices, and the server devices where applicable, may be configured to further disable one or more of the selection, copying, forwarding on, etc. of the message content data of data messages having a persistence attribute that has been set.

In the above embodiments, the message delete function is user-selectable via the user interface for data messages that are not set as irrevocable by the sender. Additionally or alternatively, the deletion of some or all of non-persistent data message contents may take place on a recipient's device for example as a function of time dependent on one or more message attributes contained in the received data message. Attributes contained in the received non-persistent data messages that can affect or be used to determine the lifetime of contained information or the starting time and end time of the display of said information on a recipient's device may include the geographical location, unique identification or user ID, and/or any other relevant characteristic or derived characteristic of the sender and/or device. Attributes of the recipient's device that can affect or be used to determine the lifetime of said non-persistent content data or the starting time and end time of the display of said information on a recipient's device may include the geographical location, unique identification or user ID, and the status of the recipient and/or device. A set time limit, a maximum time or a minimum time may be determined or directly specified by a timer attribute parameter or by other data message time attribute or one or more attributes of the recipient's device or a combination thereof.

As another alternative, non-persistent data messages may be sent to multiple recipients with the aim that the recipients see the contained content data for the same predetermined length of time. A timer attribute in each data message can be used to identify the display time limit of the content data, which may be defined relative to determination of the occurrence of a predefined event by the recipient's device. As a yet further modification, the timer attribute in each data message can define an absolute starting time that said information shall be displayed by the IM client, such that before this time the recipient will not be able to view said information contained in the received data message. It may be further desired that all recipients are synchronised in their viewing of said information, in which case another timer attribute conveys the time the data message was sent, and when the data message is received, the identified time of sending can be compared to the system time indicated by the recipient's device, so that a time offset error may be calculated. The information contained in the data message can be displayed by the IM client on the recipient's device when the time indicated by the recipient's device is equal to said absolute starting time minus said time offset error. In this way, the system can ensure that the information will be displayed on each recipient's device at the same time.

In yet a further alternative embodiment, the system can be configured to take into account the event that some recipient devices are offline, wherein the information will not be displayed on any recipient's device until such time as all recipients are online, or a given percentage of recipients are online or a fixed point in time has been passed. For example, the server and IM clients can be adapted to implement command and status messages transmitted therebetween, the messages including data identifying that a respective event or action has occurred, along with a timestamp of the occurrence. It is appreciated that other forms of synchronisation techniques may be instead be used to synchronise the recipients' devices so that the contained information in received data messages may be displayed at the same starting time. It is further appreciated that the server may be configured to maintain synchronization of the acknowledgement status attributes of corresponding data messages for sender and recipient devices that are offline, where data can only be transmitted by the server to the devices after the respective sender or recipient becomes online.

As a further modification, additional cryptography can be employed so that it almost impossible for a recipient to gain an advantage by displaying or otherwise access any sent information ahead of other recipients. In such an embodiment, the information contained in sent data messages is encrypted using an encryption key that is unknown to the recipients. An example of a suitable encryption method is the Advanced Encryption Standard (AES), as defined in Federal Information Processing Standards Publication 197, United States National Institute of Standards and Technology (NIST), Nov. 26, 2001. AES is an example of symmetric encryption system where there is a secret key that is used to encrypt information and the same key is used to decrypt the information. There are also asymmetric encryption systems where the encryption key is a public key that is no help in trying to break the system because a different, secret key is used for decryption. RSA is one example of such a system, Either symmetric or asymmetric key encryption may be used in these embodiments. The decryption key is withheld from the recipients so that although the recipients may have received the data messages containing said information, it is impossible for them to access the information without the decryption key or breaking the encryption system. At a suitable time, a data message containing the decryption key together with one or more timer attributes is sent, possibly simultaneously, to each intended recipient. The system then operates as in the embodiments discussed above. Encrypting the said information ensures that is almost impossible for intended recipients to access the information prior to the decryption key being sent.

Yet further alternative embodiments may be envisaged, which nevertheless fall within the scope of the following claims.

The invention claimed is:

1. A method of providing instant messaging communication between users via a communication network, comprising:
    executing an instant messaging client at a user device of a first user and an instant messaging client at a user device of a second user;
    transmitting a data message from the instant messaging client at the user device of the first user to the instant messaging client at the user device of the second user, the data message having a content portion and at least one associated attribute identifying the content portion as persistent data; and
    controlling the availability of at least one user-selectable function by the instant messaging client at the user device of the second user, based on the at least one associated attribute, wherein said controlling comprises disabling or omitting a data message delete function.

2. The method of claim 1, wherein the at least one associated attribute includes an attribute identifying an acknowledgement status of the data message, wherein controlling the availability of at least one user-selectable function is further based on the acknowledgement status of the data message.

3. The method of claim 2, wherein the instant messaging client at the user device of the second user prompts for a user input signature to acknowledge receipt of the data message based on an unsigned acknowledgement status.

4. The method of claim 3, wherein the signature is a digital signature that verifies the identity of the recipient.

5. The method of claim 4, wherein the signature is a biometric information file including at least a portion of the content portion implanted therein.

6. The method of claim 1, further comprising controlling the availability of the same at least one user-selectable function by the instant messaging client at the user device of the first user, based on the at least one associated attribute.

7. The method of claim 1, further comprising determining that a non-persistent data message is expired based on at least one message attribute, and removing the content portion of the expired non-persistent data message from memory.

8. The method of claim 1, further comprising displaying a plurality of sequential data messages of a conversation, wherein a footprint of a non-persistent data message having a content portion that was removed from memory is retained in the displayed conversation.

9. The method of claim 8, wherein the footprint includes a digital signature of the first user.

10. The method of claim 1, wherein the data message is transmitted from the instant messaging client at the user device of the first user to an instant messaging client at a user device of a third user.

11. The method of claim 10, wherein synchronisation of the at least one associated attribute of corresponding data messages at all of the instant messaging clients is maintained by a remote messaging server.

12. The method of claim 1, wherein the content portion of the data message comprises one or more of: text data, image data, audio data, video data and encoded data, or combinations thereof.

13. The method of claim 1, further comprising determining that one or more recipients are offline and in response, storing the data message on one or more servers until it is determined that the recipients become online and subsequently receive the data message sent by said servers.

14. A system or apparatus for providing instant messaging communication between users via a communication network, comprising at least one processor configured to:
    execute an instant messaging client at a user device of a first user and an instant messaging client at a user device of a second user;
    transmit a data message from the instant messaging client at the user device of the first user to the instant messaging client at the user device of the second user, the data message having a content portion and at least one associated attribute identifying the content portion as persistent data; and
    control the availability of at least one user-selectable function by the instant messaging client at the user device of the second user, based on the at least one associated attribute, by disabling or omitting a data message delete function.

15. The system of claim 14, said processor further configured to display a plurality of sequential data messages of a conversation, wherein a footprint of a non-persistent data message having a content portion that was removed from memory is retained in the displayed conversation.

16. The system of claim 15, wherein the footprint includes a digital signature of the first user.

17. A non-transitory computer-readable medium comprising computer-executable instructions, that when executed, perform a method of providing instant messaging communication between users via a communication network, comprising the steps of:
    executing an instant messaging client at a user device of a first user and an instant messaging client at a user device of a second user;
    transmitting a data message from the instant messaging client at the user device of the first user to the instant messaging client at the user device of the second user, the data message having a content portion and at least one associated attribute identifying the content portion as persistent data; and
    controlling the availability of at least one user-selectable function by the instant messaging client at the user device of the second user, based on the at least one associated attribute, wherein said controlling comprises disabling or omitting a data message delete function.

18. The non-transitory computer-readable medium of claim 17, said steps further comprising displaying a plurality of sequential data messages of a conversation, wherein a footprint of a non-persistent data message having a content portion that was removed from memory is retained in the displayed conversation.

19. The non-transitory computer-readable medium of claim 18, wherein the footprint includes a digital signature of the first user.

* * * * *